(12) United States Patent
Chong et al.

(10) Patent No.: US 11,178,529 B2
(45) Date of Patent: Nov. 16, 2021

(54) GATEWAY DEVICE FOR IOT SENSORS OR ACTUATORS

(71) Applicant: WILLOWMORE PTE. LTD., Singapore (SG)

(72) Inventors: Chieh Tseng Chong, Singapore (SG); Alan Hogg, Singapore (SG); Joseph Choon Koon Tey, Singapore (SG)

(*) Notice: Subject to any disclaimer, the term of this patent is extended or adjusted under 35 U.S.C. 154(b) by 0 days.

(21) Appl. No.: 16/764,005

(22) PCT Filed: Nov. 27, 2018

(86) PCT No.: PCT/SG2018/050579
§ 371 (c)(1),
(2) Date: May 14, 2020

(87) PCT Pub. No.: WO2019/103696
PCT Pub. Date: May 31, 2019

(65) Prior Publication Data
US 2020/0336878 A1    Oct. 22, 2020

(30) Foreign Application Priority Data
Nov. 27, 2017    (SG) .......................... 10201709812R (51) Int. Cl.
*H04W 4/80* (2018.01)
*H04W 76/25* (2018.01)
(Continued)

(52) U.S. Cl.
CPC .............. *H04W 4/80* (2018.02); *H04L 12/66* (2013.01); *H04L 67/12* (2013.01); *H04W 4/38* (2018.02);
(Continued)

(58) Field of Classification Search
CPC ......... H04W 4/80; H04W 4/38; H04W 76/25; H04W 76/18; H04W 8/005;
(Continued)

(56) References Cited

U.S. PATENT DOCUMENTS

| 6,714,530 B1* | 3/2004 | Haartsen .................. H04B 7/26 370/347 |
| 2011/0021142 A1* | 1/2011 | Desai .................... H04W 8/005 455/41.2 |

(Continued)

FOREIGN PATENT DOCUMENTS

| CN | 103744411 A | 4/2014 |
| CN | 110677893 A * | 1/2020 |

(Continued)

OTHER PUBLICATIONS

International Search Report; Singapore; dated Jan. 31, 2019.

*Primary Examiner* — Dong-Chang Shiue
(74) *Attorney, Agent, or Firm* — PatShegen IP; Moshe Pinchas (57) ABSTRACT

The present invention describes a gateway device (100, 100a) for wirelessly connecting IoT sensors, actuators or devices (150, 151, 152, etc.) and aggregating the sensor/actuator/device data into data packages (160); these sensor connections use short range (SR) wireless communication, which includes Bluetooth, BLE, Zigbee, NFC or similar wireless technology. The data packages (160) are then transmitted to a monitor centre (190) at predetermined time intervals via a low power, long range (LR), wireless wide area network (LPWAN), which includes NB-IoT, Sigfox, LoRa or similar wireless technology. BLE standard is modified to further reduce battery power consumption for use in the gateway device. In addition, scheduling of SR and LR transmissions averts wireless interference.

15 Claims, 5 Drawing Sheets

(51) Int. Cl.
*H04W 4/38* (2018.01)
*H04W 76/18* (2018.01)
*H04L 12/66* (2006.01)
*H04L 29/08* (2006.01)
*H04W 8/00* (2009.01)
*H04W 52/02* (2009.01)
*G06N 5/04* (2006.01)
*H04W 88/16* (2009.01)

(52) U.S. Cl.
CPC ....... *H04W 8/005* (2013.01); *H04W 52/0203* (2013.01); *H04W 76/18* (2018.02); *H04W 76/25* (2018.02); *G06N 5/04* (2013.01); *H04W 88/16* (2013.01)

(58) Field of Classification Search
CPC . H04W 52/0203; H04W 88/16; H04W 74/04; H04W 84/18; H04W 52/02; H04L 12/66; H04L 67/12; G06N 5/04; Y02D 30/70
See application file for complete search history.

(56) References Cited

U.S. PATENT DOCUMENTS

2016/0315470 A1* 10/2016 Tomar .................... G06Q 50/06
2017/0026905 A1    1/2017 Denboer et al.
2017/0230907 A1*  8/2017 Rose ................ H04W 52/0277
2018/0286213 A1* 10/2018 Schueler .......... H04W 52/0216

FOREIGN PATENT DOCUMENTS

WO    2015107538 A2    7/2015
WO    2018063603 A1    4/2018

* cited by examiner

GATEWAY DEVICE FOR IOT SENSORS OR ACTUATORS

FIELD OF INVENTION

The present invention relates to a battery-powered gateway device for connecting Internet-of-things wireless sensors, actuators and devices to a remote monitor centre through a low power wireless wide area network (LPWAN).

BACKGROUND

Smart devices and wireless sensors are driving the Internet-of-Things (IoT) technology. Therefore, there is a need to connect battery-powered sensors, actuators and devices at low power levels to a remote monitor centre.

SUMMARY

The following presents a simplified summary to provide a basic understanding of the present invention. This summary is not an extensive overview of the invention, and is not intended to identify key features of the invention. Rather, it is to present some of the inventive concepts of this invention in a generalised form as a prelude to the detailed description that is to follow.

The present invention seeks to provide a gateway device to aggregate data via Short Range (SR) wireless communication from a plurality of wireless sensors/actuators and to transmit the aggregated sensor data to a remote monitor centre through a Low Power Wireless Wide Area Network (LPWAN). By aggregating sensor data at the gateway device, transmission efficiency is improved; this also reduces sensor deployment costs and IoT network operating costs. When Bluetooth Low Energy (BLE) is employed for SR communication, BLE sensor discovery and connection processes are configured to conserve battery power. Artificial intelligence or machine learning to recognize a time pattern of SR communication between the gateway device and the wireless sensors/actuators allows a scanner in the gateway device to be powered on only during those necessary time periods to further conserve battery power. An advantage is that the LR communication is powered on only when the SR communication is powered down to avert SR and LR interference.

In one embodiment, the present invention provides a gateway device for an IoT system comprising: a short range (SR) wireless communication module for interfacing with one or more sensors, actuators or devices; a memory unit containing a software to control a micro-controller, wherein data from the one or more sensors, actuators or devices are aggregated into a data package; a low power, long range (LR) wireless communication module for transmitting the data package to a monitor centre at predetermined time periods; and a battery for powering the gateway device.

Preferably, the SR wireless communication module comprises a chip set providing Bluetooth, Bluetooth low energy (BLE), Zigbee, near-field communication (NFC) or similar short range wireless communication. Preferably, the LR wireless communication module comprises a chip set providing narrow-band IoT (NB-IoT), Sigfox, LoRa or similar low power, long range wireless communication.

Preferably, the gateway device comprises an artificial intelligence or a machine learning module disposed in the microcontroller to record time blocks when the SR communication is silent and, in response, to turn off radio associated with the SR communication to conserve battery power as well as to turn on radio associated with the LR communication so as to avert interference with the SR communication.

In another embodiment, the present invention provides a Bluetooth Low Energy (BLE) scanner in a gateway device being configured to listen for an IoT sensor/actuator/device with reduced power consumption comprising: dividing a BLE scan cycle into 64 equal time blocks so that a scan window has a scan interval lasting 160 ms; shifting a BLE scan window by one time block for each scan cycle to listen for any BLE sensor that is within range and is cyclically advertising; and repeating the scan window shifting and listening processes until a scan window time block substantially or effectively coincides with a time block that a BLE sensor is advertising, and in response establish a BLE connection between the BLE sensor and the BLE scanner, thereby turning on the BLE scanner during these connected time blocks to conserve battery power.

In one embodiment, the BLE scanner is turned on for substantially 1.56% of the time during each scan cycle. Also, the BLE scanner is turned off during the time blocks outside the BLE connection in all the channels to conserve battery power.

Preferably, when a BLE sensor broadcast timing has drifted and BLE connection is lost, a microcontroller for controlling the gateway system creates two scan windows in a successive scan cycle, with a first scan window located one scan interval prior to the previously known connected scan window and a second scan window located one scan interval after the previously known connected scan window, and directionally shifting the first scan windows and the second scan window outwardly to the left and right by one scan interval, respectively, in each successive scan cycle to facilitate fast sensor re-discovery and re-connection, with concomitantly low power consumption.

Preferably, the BLE scanner comprises an artificial intelligence or a machine learning module disposed in the gateway device to record and learn the pattern of the BLE scanner time blocks which synchronise with the BLE sensors/actuators, so that the BLE scanner is powered on only during these time blocks to reduce power consumption. In addition, long range (LR) wireless communication with a monitor centre is initiated only when the BLE scanner connected to the BLE sensor or sensors is silent or turned off, so as to avert BLE and LR wireless interference.

BRIEF DESCRIPTION OF THE DRAWINGS

This invention will be described by way of non-limiting embodiments of the present invention, with reference to the accompanying drawings, in which.

DETAILED DESCRIPTION

One or more specific and alternative embodiments of the present invention will now be described with reference to the attached drawings. It shall be apparent to one skilled in the art, however, that this invention may be practised without such specific details. Some of the details may not be described at length so as not to obscure the invention. For ease of reference, common reference numerals or series of numerals will be used throughout the figures when referring to the same or similar features common to the figures.

Figure 1A:
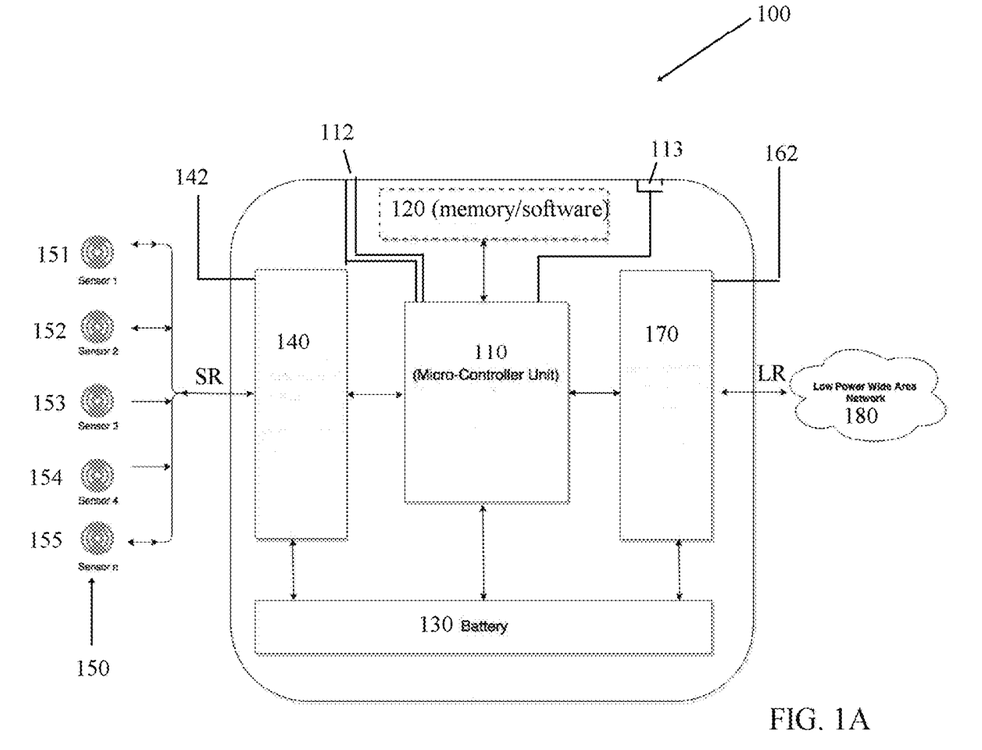
FIGS. 1A and 1B illustrate schematic architecture of two sensor gateway devices according to embodiments of the present invention.
Figure 2:
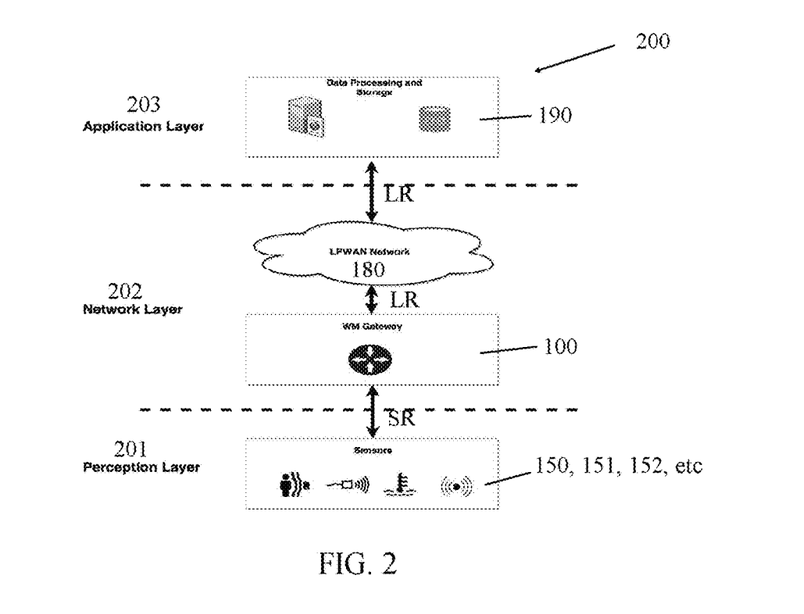
FIG. 2 illustrates 3 layers of the gateway architecture shown in FIGS. 1A and 1B.
Figure 3:
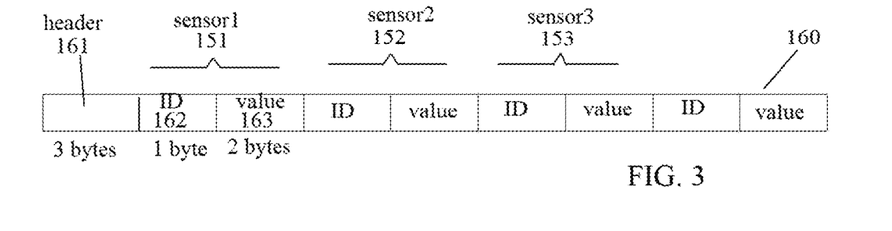
FIG. 3 illustrates an encoded message containing some aggregated sensor data.

FIG. 1A shows a schematic architecture of a wireless, low power sensor gateway device 100 according to an embodiment of the present invention. The gateway device 100 has low power consumption, is powered by a battery 130 and it includes a micro-controller 110 connected to a memory unit 120, a short range (SR) wireless communication module 140 (which may include a chipset or chipsets employing Bluetooth, Bluetooth Low Energy (BLE), ZigBee, Near-field communication (NFC), or similar SR wireless technology), a low power long range (LR) wireless communication module 170 (which may include a chipset or chipsets employing narrow-band NB-IoT, SigFox, LoRa communication, or similar low power LR wireless technology), a setup/mode switch 112 and an external connection port 113, besides other accessories. The SR communication module 140 interfaces with a plurality of sensors/actuators/devices 150,151,152, etc. and collects data from the sensors/actuators/devices and pushes sensor data into the micro-controller 110 for filtering and raw data aggregation into compact data packages 160 (as shown in FIG. 3). These compact data packages 160 are then transmitted periodically to a remote monitor centre 190 through the LR communication module 170 (as seen in FIGS. 1A and 2). A software or firmware 121 is stored in the memory unit 120 for operating the micro-controller 110. The gateway device 100 is located near a group of sensors/actuators/devices within range of the SR communication via an associated SR antenna 142; by providing the gateway device 100 to serve a group of sensors/actuators/devices 150, 151, 152, etc., the cost of deploying the sensors/actuators becomes lower. The cost for transmitting the data packages 160 to the remote monitor centre 190 also becomes lower. In short, there is higher efficiency and cost effectiveness in using the gateway device 100 in an IoT system 200 illustrated in FIG. 2.

Figure 1B:
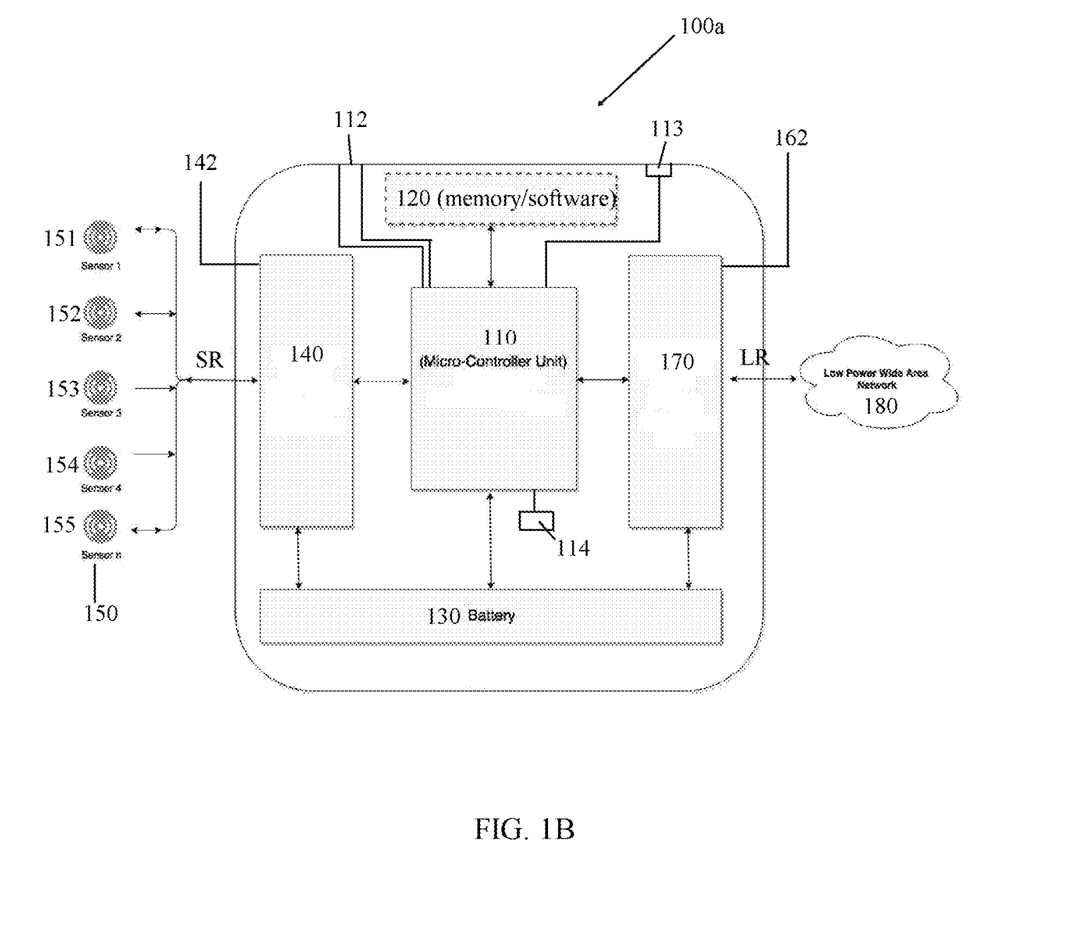

FIG. 1B shows another gateway device 110a in which a web server module 114 is connected directly with the micro-controller 110. As seen in FIGS. 1A and 1B, the gateway device 100, 100a is connected to an external setup device/computer through the connection port 113 (such as, USB, wifi, LAN, Bluetooth, and so on). A setup routine 210 in the setup device/computer allows the number of sensors/actuators to be scalable (such as, adding of new sensors/actuators and associated drivers) and maintained (such as, replacing any of the sensors/actuators). During the setup mode, electric power may be supplied from the setup device/computer through the port connection 113; in addition, the battery 130 can also be charged during setup or via this port 113. The setup mode can also be done remotely through the web server module 114.

In FIG. 2, the IoT system 200 architecture is broadly described to make up of 3 layers, namely, a perception layer 201, a network layer 202 and an application layer 203. At the perception layer 201, sensors/actuators 150, 151, 152, etc. are continuously listening, sensing or collecting information/data about the environment or apparatus that is being monitored. The collected sensor/actuator information/data is then transmitted through the SR wireless communication to the gateway device 100,100a, which is located in the network layer 202. The gateway device 100,100a consolidates the collected sensor/actuator information/data into data packages 160 and transmits the data packages 160 at predetermined periodic intervals through the LR wireless communication to the remote monitor centre 190, which is located at the application layer 203. At the application layer 203, the raw sensor/actuator/device data are stored, processed and analysed, and useful information is extracted, displayed or made available to a user. When necessary to correct or adjust the apparatus being monitored, a downlink command can be issued to the associated sensor/actuator/device 150, 151, 152, etc. or an alert is issued for maintenance action.

FIG. 3 shows an example of the data package 160 containing aggregated sensor/actuator data. Each data package 160 contains a header 161, identity ID 162 of sensor/actuator/device #1, identity 162 of sensor/actuator/device #2, and so on. The header 161 may contain information on the number of sensors from which data are collected from each sensor identity ID 162 and the associated sensor value/digital data 163. Depending on the LR wireless communication protocol, there is a limit on the size of the data package 160 for transmission. For example, the header 161 data may be restricted to 3 bytes, with the sensor ID and data generally making up 1 byte and 2 bytes, respectively.

Figure 4:
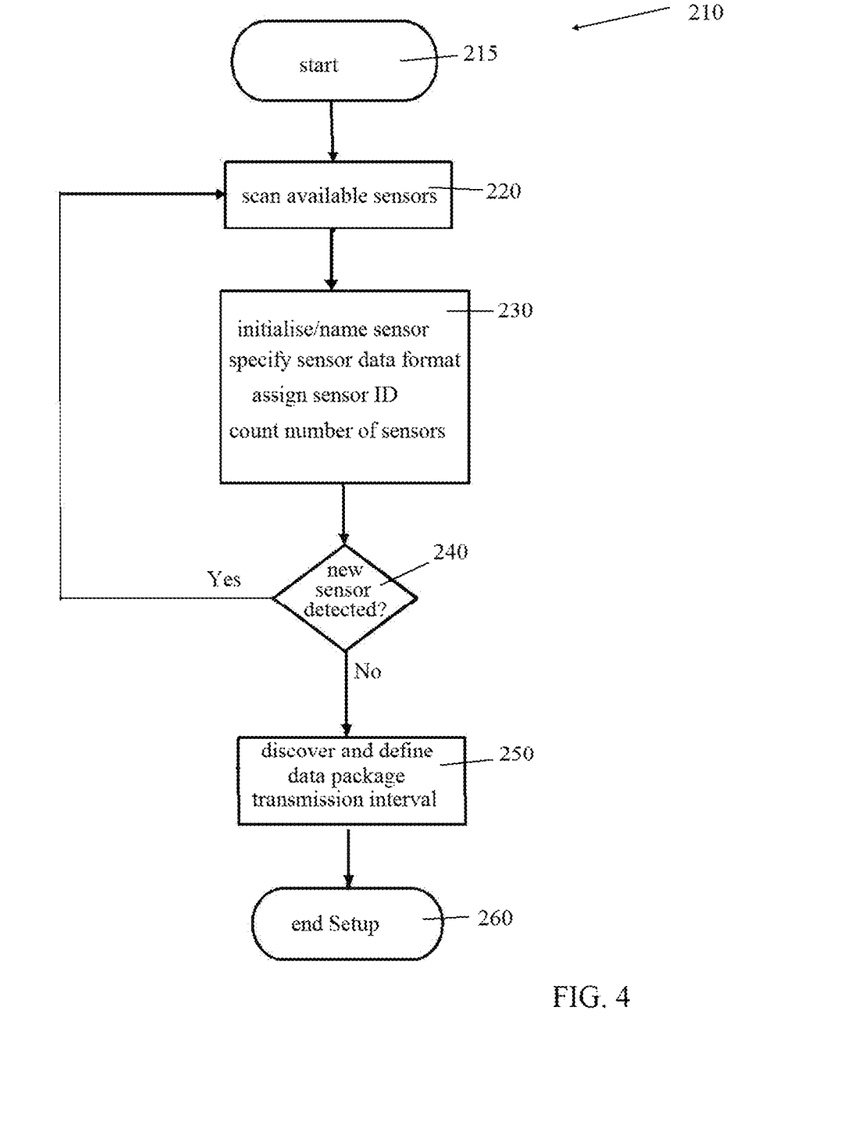
FIG. 4 illustrates a flow chart for setting up sensor connection at the gateway device.
Figure 5A:
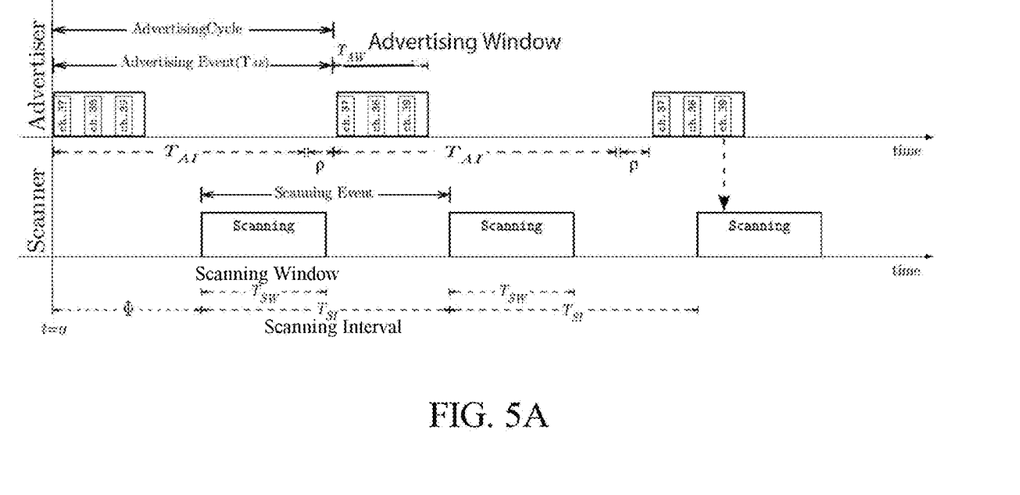
FIG. 5A illustrates characteristics of a Bluetooth Low Energy (BLE) advertising event and a BLE listening event, whilst
Figure 5B:
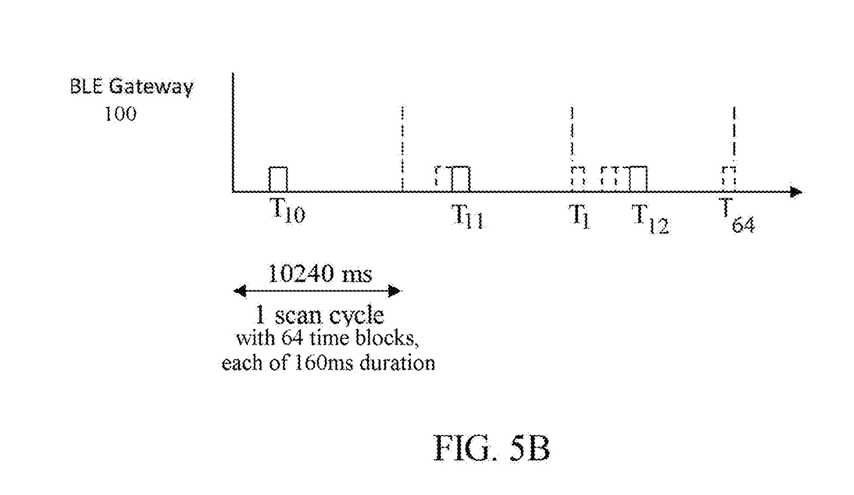
FIG. 5B illustrates a BLE scanning process according to an embodiment of the present invention.
Figure 5C:
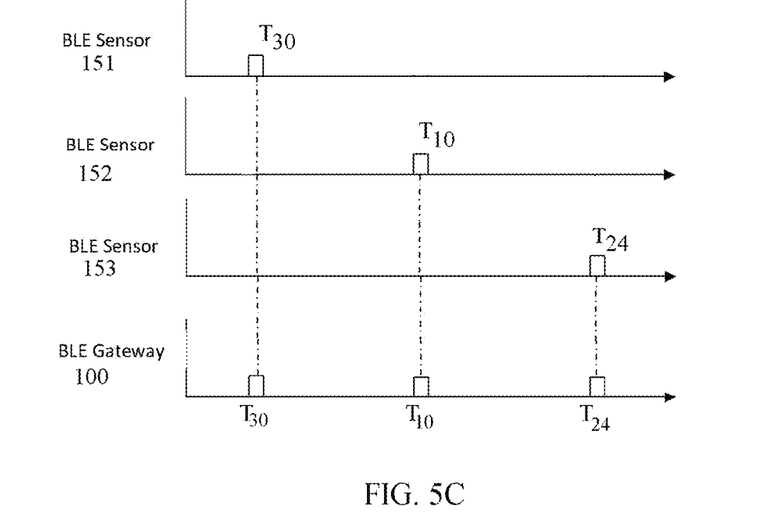
FIG. 5C illustrates BLE connections made between BLE sensors and a BLE gateway device.

FIG. 4 shows the setup routine 210 when connecting sensors/actuators/devices 150, 151, 152, etc. to the gateway device 100,100a during an initial setup process. To start the setup routine 210, in step 215, a computer is connected to the gateway device 100,100a, for eg. via USB, wifi or LAN to the connection port 113. Alternatively, the mode switch 112 is turned to Setup mode to scan for available SR wireless sensors/actuators, in step 220. Once a wireless sensor is detected, in step 230, each sensor 150 is registered, an ID 162 is assigned, and an associated name is recorded. The sensor data format is also recorded. This sensor initiation and identification are carried out for all the sensors/actuators/devices 150, 151, 152, etc. that are within SR communication with the gateway device 100,100a; the total number of sensors configured is then determined in decision step 240; if no new sensors/actuators/devices are identified, the setup routine 210 proceeds to, step 250, to discover and then define the specific data package transmission time blocks that each specific sensor/actuator/device advertises within (as illustrated in FIG. 5C). Then, the gateway device 100, 100a will be configured to scan during these specific time blocks, before ending the setup routine in step 260. During configuration of the setup routine 210, the gateway device (operating in a scanner mode) is configured so the IoT system 200 can learn and record predefined durations for scanning. Usually, the gateway device would scan continuously for a long duration over each scan cycle to capture a nearby sensor/actuator operating pattern/regime; this will consume a lot of battery power. In the present invention, during the configuration mode, the gateway device 100,100a is turned on progressively at each scan cycle, from time block T1 to time block T64, to discover which time block a sensor advertises on.

In the above sensor/actuator discovery step 250, operation is only for sensors/actuators that are in working order and are advertising. For sensor/actuator that has time-critical alert or contain ad-hoc message, these sensors/actuators are programmed to broadcast continuously for a minimum of 1 scan cycle.

In the above description, short range (SR) wireless communication employing Bluetooth Low Energy (BLE) technology has been mentioned. To improve on BLE performance, it is possible to further minimize energy consumption to achieve energy efficiency and yet maintain responsiveness of this gateway device 100,100a for an IoT application. A BLE sensor/actuator/device 150, 151, 152, etc., called an advertiser, periodically broadcasts short data packages (PDU) within an advertising window $T_{AW}$, as shown in FIG. 5A. At the end of an advertising window, the BLE radio in the BLE sensor/actuator is powered-off until the start of the next advertising event to further conserve battery power. In order to listen to every message broadcasted by the BLE sensors/actuators, the gateway device 100,100a operating in a scanner mode is turned on so that scanning windows $T_{SW}$ coincide with the advertising windows that are specific to an individual sensor/actuator 150, 151,152, etc. Each listening or scanning cycle is defined by a scan interval $T_R$, and the gateway device is turned on during each scanning window.

Usually, at the start or initialization of the gateway device 100,100a (BLE scanner) and the BLE sensor/actuator 150, 151, etc. are turned on at different times and, therefore, there is no synchronization of start time for the advertising interval ($T_{AI}$) and the scan interval ($T_{SI}$). As a result, the advertising event does not occur at substantially or effectively the same time as the scanning window, as seen in FIG. 5A except for the third advertising window in channel 39. In standard BLE, the scanner is usually powered up all the time or half the time if the scan window ($T_{SW}$) is half the scan interval ($T_{SI}$); this consumes a lot of electrical power, thus making the use of standard BLE unsuitable for battery-operated IoT device. To reduce BLE power consumption, the present invention modifies the BLE standard to suit low power consumption for IoT use. In one embodiment of the present invention, the BLE standard is modified so that each BLE scan cycle is set at 10,240 ms, and each scan cycle is divided into 64 time-blocks (see FIG. 5B), giving a scan window $T_{SW}$ of 160 ms. With this modified BLE standard, the BLE radio is turned on substantially 1.56% of the time during each scan cycle.

Table 1 shows a summary of the BLE parameters modified for reduced power consumption:

| Parameter | Notation | Value according to the present invention |
| --- | --- | --- |
| Scan Interval | $T_{si}$ | =160 ms for 64 time blocks |
| Scan Window | $T_{sw}$ | $T_{sw} = T_{sI}$ |
| Scan Cycle | $T_{sc}$ | =10,240 ms |
| Advertising Interval | $T_{AI}$ | 20 (or 100) ms ≤ $T_{AI}$ ≤ 10.24 s integer multiple of 0.625 ms |
| Advertising Delay | ρ | pseudo-random value in [0, 10] ms |
| Advertising Event | $T_{AE}$ | =$T_{AI}$ + ρ |
| Adv. Indication interval | $T_{AW}$ | ≤10 ms (low duty cycle) |

Figure 5D:
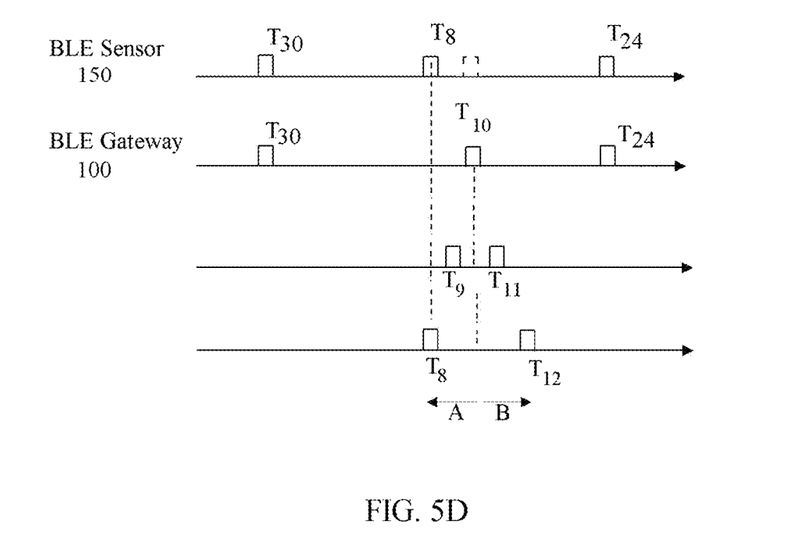
FIG. 5D illustrates a BLE sensor re-discovery process after a BLE sensor advertising event has drifted according to yet another embodiment of the present invention.

A second modification is in optimizing the BLE scanner process, in the event of the BLE sensor/actuator 150,151, etc. broadcast timing has drifted with respect to the gateway device 100,100a (operating in scanner mode), for e.g., after replacing a battery in a BLE sensor, a BLE sensor is faulty, and so on. The present invention provides a fast connection method at low power consumption (instead of re-establishing connection via a fresh discovery operation (in step 250 of the sensor setup routine 210)). In this fast connection method, two scan windows are created (in a successive scan cycle) from one previously known connected scan time block, so that a first scan window appears before and a second scan window appears after the previously known connected scan time block, as shown in FIG. 5D. For illustration, in FIG. 5D, the previous known connected scan time block is shown at T10, the first and the second scan windows at time blocks T9 and T11 are created in a successive scanning cycle. During each successive scan cycle, the first scan window is again shifted by one scan interval to the left hand side (as indicated by arrow A in FIG. 5D), while the second scan window is again shifted by one scan interval to the right hand side (as indicated by arrow B). This method is repeated for a few scanning cycles until the gateway device 100,100a (operating in scanner mode) discovers the missing BLE sensor/actuator. With this method, the number of scanning cycles to re-establish sensor discovery is fewer, thus leads concomitantly to conserving some battery power. If BLE rediscovery operation fails to establish after a predetermined number of scanning cycles, a fresh sensor discovery operation is initiated (ie. initiate step 250). Alternatively, if BLE rediscovery fails to establish after a predetermined number of scanning cycles, the BLE sensor/actuator is deemed missing or faulty or has failed, an alert message is sent to the remote monitor centre 190 for follow-up action.

In the BLE gateway device 100,100a, power in short range (SR) wireless communication is relatively low, for eg. 10 mW, whilst the power in long range (LR) wireless communication is substantially higher, for eg. 200 mW. Due to proximity of the SR and LR antennae, harmful interference becomes an issue; any harmful interference will result in decrease of the effective ranges of SR and LR communication. From the aggregated advertising and scanning time blocks records, the microcontroller 110 is able to determine the time blocks when the SR communication are idle or silent, and the microcontroller is configured to activate LR communication only during the time blocks when the SR communication is silent. With this feature, interference or blocking of SR communication by the LR communication is averted.

The sensors/actuators/devices 150,151,152, etc. may be binary devices or analog devices. Data of binary devices is defined in two states, 0 or 1, or on or off. Data of analog devices (such as, temperature or humidity readings) can be represented in hexadecimal values. To reduce the data packet 160 size for the LR wireless communication to send to the monitor centre 190, the latest set of sensor/actuator data is recorded in the memory 120 of the gateway device 100,100a; if there are no changes to the binary data or pattern of the analog data is repeated, the gateway device 100,100a will only send a heartbeat message to the monitor centre stating that there is no change in data value, instead of sending all the sensor data periodically. An advantage of sending this heartbeat message is also to meet a reduced payload on certain LPWAN, such as, a package size limit of 12 bytes using Sigfox.

Whilst BLE wireless technology has been used to exemplify the above invention, some of the processes and methods are also applicable for use with other SR wireless technology, including other Bluetooth standards, Zigbee, NFC, and so on, and other LR wireless technology, including NB-IoT, Sigfox, LoRa, and so on. For instance, the microcontroller 110 employs artificial intelligence or machine learning in scheduling of SR and LR communication to avert interference is applicable for all the various types of SR and LR wireless technologies. In another instance, when there are no changes to the binary data or pattern of the analog data is repeated, the gateway device 100,100a will only send a heartbeat message to the monitor centre 190 stating that there is no change in data value, instead of sending all the sensor data periodically. In yet another instance, when a sensor/actuator needs to send time-critical alert or ad-hoc message to the monitor centre 190, the sensor/actuator has to broadcast the time-critical alert/ad-hoc message for the gateway device 100,100a to pick up; in response to receipt of the time-critical alert/ad-hoc message, a downlink command can be issued from the monitor centre 190 to correct or adjust the apparatus linked to the sensor/actuator 150,151, etc. (for eg. to trigger a fixed camera sensor to be turned on).

While specific embodiments have been described and illustrated, it is understood that many changes, modifications, variations and combinations thereof could be made to the present invention without departing from the scope of the present invention.

The invention claimed is:

1. A gateway device for an IoT system comprising:
   a short range (SR) wireless communication module for interfacing with one or more BLE (Bluetooth low energy) sensors, actuators or devices;
   a memory unit containing a software to control a micro-controller, wherein data from the one or more BLE sensors, actuators or devices are aggregated into a data package;
   a low power, long range (LR) wireless communication module for transmitting the data package to a monitor centre at predetermined time periods;
   an artificial intelligence or a machine learning module disposed in the micro-controller to record time blocks when the SR wireless communication is silent and, in response, to turn on a radio associated with the LR wireless communication, so as to avert interference between the SR and LR wireless communication; and
   a battery for powering the gateway device;
   wherein the microcontroller is configured such that when a BLE sensor, actuator or device's broadcast timing has drifted or disappeared and BLE data package is lost, the microcontroller creates two scan windows in a successive scan cycle, with a first scan window located one scan interval prior to the previously known connected scan window and a second scan window located one scan interval after the previously known connected scan window, and directionally shifting the first scan window and the second scan window outwardly to the left and right by one scan interval, respectively, in each successive scan cycle to facilitate fast sensor or actuator re-discovery and re-connection, with concomitantly low power consumption.

2. The IoT gateway device according to claim 1, further comprising a setup/gateway mode switch, a charging port/local communication port and a web server module.

3. The IoT gateway device according to claim 1, wherein the SR wireless communication module is configured with a BLE a chip set.

4. The IoT gateway device according to claim 1, wherein the LR wireless communication module comprises a chip set providing narrow-band IoT (NB-IoT), Sigfox, LoRa or similar low power, long range wireless communication.

5. The IoT gateway device according to claim 1, wherein the gateway device is connectable to an external setup device via a USB, wifi or LAN port.

6. The IoT gateway device according to claim 1, wherein when the SR or LR wireless communication is silent, the gateway device is operable to turn off the radio associated with the SR or LR wireless communication so as to conserve power in the battery.

7. The IoT gateway device according to claim 1, wherein each data package comprises a header and sensor information, which sensor information includes the sensor identity and sensor value.

8. The IoT gateway device according to claim 7, wherein when the sensor value does not change, only a heartbeat message is sent to the monitor centre, instead of sending sensor value periodically.

9. The IoT gateway device according to claim 1, wherein when a data package contains a time-critical message or an ad-hoc message, the associated sensor, actuator or device transmits the message broadcast to the IoT gateway device.

10. The IoT gateway device according to claim 1, wherein:
    a BLE scan cycle is divided into 64 equal time blocks so that a scan window has a scan interval lasting 160 ms;
    a BLE scan window is shifted by one time block for each scan cycle to listen for any BLE sensor or actuator that is located within range and is cyclically advertising; and
    the scan window shifting and listening processes are repeated until a scan window time block substantially or effectively coincides or synchronises with a time block that a BLE sensor or actuator is advertising, and in response turning on a BLE scanner located in the IoT gateway device during these synchronised or connected time blocks to further conserve power in the battery.

11. The IoT gateway device according to claim 10, wherein a duty cycle of the scan window is a unity and therefore the BLE device is turned on for substantially 1.56% of the time during each scan cycle.

12. The IoT gateway device according to claim 10, wherein the IoT gateway device is turned off during the time blocks laying outside the sychronised or connected BLE time blocks to further conserve power in the battery.

13. The IoT gateway device according to claim 1, wherein after operating a predetermined number of re-discovery and re-connection scanning cycles, and reconnection fails, the microcontroller starts a fresh BLE sensor or actuator discovery and connection operation.

14. The IoT gateway device according to claim 13, wherein after operating a predetermined number of fresh BLE discovery cycles and connection fails to re-establish, the microcontroller declares a BLE sensor or actuator failure, and sends an alert to the monitor centre.

15. The IoT gateway device according to claim 1, wherein the artificial intelligence or a machine learning module records and learns the pattern of the IoT gateway scanner time blocks which synchronise with the time blocks of the BLE sensors or actuators, so that the IoT gateway device radio is powered on only during these synchronised time blocks so as to further conserve power in the battery.

* * * * *